(12) United States Patent
Ferragina et al.

(10) Patent No.: US 6,434,566 B1
(45) Date of Patent: Aug. 13, 2002

(54) METHOD AND SYSTEM FOR SUPPORTING MULTI-METHOD DISPATCHING IN OBJECT-ORIENTED PROGRAMMING

(75) Inventors: Paolo Ferragina, Catanzaro (IT); Shanmugavelayut Muthukrishnan, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/203,066

(22) Filed: Dec. 1, 1998

(51) Int. Cl.[7] ............................................... G06F 17/00
(52) U.S. Cl. .................... 707/102; 707/103 R; 709/315
(58) Field of Search ............... 707/1–206; 709/100–332

(56) References Cited

U.S. PATENT DOCUMENTS

| | | | | |
|---|---|---|---|---|
| 5,978,802 A | * | 11/1999 | Hurvig | 707/8 |
| 5,978,807 A | * | 11/1999 | Mano et al. | 707/10 |
| 5,978,815 A | * | 11/1999 | Cabrera et al. | 707/204 |

OTHER PUBLICATIONS

Wang et al., "Detection and segmentation of generic shapes based on affine modeling of energy in eigenspace", Image Processing, IEEE Transactions on, vol. 10, Issue 11, Nov. 2001, pp. 1621–1629.*

Werman et al., "A Bayesian method for fitting parametric and nonparametric models to noisy data", Pattern Analysis and Machine Intelligence, IEEE Transactions on, vol. 23, Issue 5, May 2001, pp. 528–534.*

Kim et al., "Conservative visibility preprocessing for complex virtual environments", Virtual Systems and Multimedia, 2001, Proceedings, Seventh International Conference on, 2001, pp. 800–808.*

* cited by examiner

Primary Examiner—David Jung
(74) Attorney, Agent, or Firm—Brown, Raysman, Millstein, Felder & Steiner, LLP

(57) ABSTRACT

A method and system for efficiently resolving the multi-method dispatching problem provided. The dispatching problem is reduced to geometric problems on multi-dimensional grids and new data structures are provided for the resulting geometric problems. In particular, methods having the same name are mapped to a set of rectangles based on a pair of numbers associated with each argument. The pair of numbers is an interval identifying the position of the argument in a class hierarchy tree. The interval is found by computing an Euler Tour of the class hierarchy tree. For a given method invocation in an object-oriented program, the method invocation is mapped to a point based on one of the numbers in the interval associated with each argument in the invocation. The problem of finding the most specific method for the method invocation is thus transformed into the so-called point enclosure problem in geometry, in which the smallest rectangle is found which encloses a given point. To help find efficient solutions to the point enclosure problem, the set of rectangles is broken into a number of subsets having certain geometric properties and stored in efficient data structures. Queries are performed on the various data structures to find the smallest or minimal rectangle, if any, in the various subsets. The result is either the identification of the minimal rectangle overall, or of an ambiguity requiring resolution by the programmer.

20 Claims, 9 Drawing Sheets

ERROR

OK

METHOD AND SYSTEM FOR SUPPORTING MULTI-METHOD DISPATCHING IN OBJECT-ORIENTED PROGRAMMING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates to object-oriented programming and more particularly, to techniques for efficiently supporting multi-method dispatching in certain object-oriented programming languages.

The use of object-oriented (OO) computer programming languages has become the norm for software development. Standard languages such as C++ and Smalltalk that embody some of the basic tenets of OO programming are highly popular. In brief, object-oriented programming involves the use of program building blocks called objects or classes, which are modules of data and processing, and for which instances may be created during execution of a program. The processing performed on data by an object is usually represented in one or more methods within the object, the methods being procedures with several arguments. Computation in OO programs proceeds by invoking methods on class instances.

Determining the correct method definition that gets applied on any such method invocation constitutes the so-called dispatching problem. The correct method definition is determined by the dynamic types or arguments of the class instances involved at the moment of invocation.

Methods in currently popular OO languages such as C++ and Smalltalk are mono-methods, that is, each method must have a unique name to avoid ambiguity with methods in other objects. In contrast, some new generation OO languages such as CommonLoops and PolyGlot support multi-methods, that is, two or more methods which have the same name and may otherwise be related such as by type or inheritance of procedures. Multi-methods are generally considered to be more expressive and hence more powerful, more natural, more readable, and less error-prone than mono-methods.

However, multi-methods raise ambiguities when methods are invoked in a program. This problem is sometimes referred to as the multi-method dispatch problem. As a result, the suitability of multi-methods in practice is in question since supporting multi-methods as opposed to single dispatching is believed to be space- and time-intensive. That is a serious concern because user programs spend considerable amount of time in dispatching.

As a simplified example of the multi-method dispatching problem, two methods may be defined both having the same name account. The methods each have two arguments—name and type. One method is defined as account (name : : <customer>, type : : <markets>), and performs certain functions when passed instances of <customer> and <market>. The second method is defined as account (name : : <person>, types : : <mutual fund>), and performs other functions when passed instances of <person> and <mutual fund>, which is a more specialized type than <market>. The second method may even inherit some functionality from the first method.

If the account method is invoked with arguments which are clearly instances of the classes defined in one method, that method is easily selected. However, if arguments are present in a method invocation from different methods, an ambiguity arises which may or may not be resolvable. In this case, an ambiguity could not be resolved without providing a third method having arguments of the general classes name : : <person> and type : : <market>. The third method would be selected in a mixed multi-method invocation.

As even this simplified example shows, multi-method dispatching requires substantial support to work effectively. The dispatching problem becomes extremely difficult to resolve as the numbers of methods and arguments increases, as they would in most useful programs.

A more formalized description of the multi-method dispatching problem is presented below to provide a better understanding of the solution provided by the present invention.

Let T be a rooted tree denoting the class hierarchy with classes as nodes. This tree defines a partial order $\prec$ on the set of classes, that is, $A \prec B$ if and only if class A is a descendant of class B. A set of methods is also defined on T, which are procedures with classes as arguments. Any pre-declared subset of the arguments of a method may be involved in the dispatching operation and these are called the dispatchable arguments; in what follows, only the dispatchable arguments are listed and others ignored. For example, $s(A_1, A_2)$ is a method with name s, dispatchable argument classes $A_1$ and $A_2$, and possibly additional arguments. The set of methods has the property that the same method name (here s) may appear many times but the methods are defined for distinct argument lists. The hierarchy and set of methods may be preprocessed.

Solving multiple dispatching involves resolving all the method invocations in the program, either at the run time or at the compile time depending on the OO language. Each method invocation is a query of the form $s(A_1, A_2, \ldots, A_d)$ where s is a method and $A_1 \ldots, A_d$ are class instances of the d dispatchable arguments in that order. For any such query, a method $s(B'_1, B'_2, \ldots, B'_d)$ is applicable if and only if $A_i \prec B_i$, for all $i=1, \ldots, d$ (note that method names must coincide). The most specialized method among the applicable ones needs to be retrieved, say $s(B'_1, B'_2, \ldots, B'_d)$, such that $\forall i, B'_i \prec C_i$ for every other applicable method $s(C_1, C_2, \ldots, C_d)$. It is possible that two methods, e.g., $s(B'_1, B'_2, \ldots, B'_d)$ and $s(B''_1, B''_2, \ldots, B''_d)$, are both applicable and neither is more specific than the other (this is called an ambiguity), that is, $B'_i \prec B''_i, B''_j \prec B'_j$ and for some indices $1 \leq i, j \leq d$. For each query, the goal is to detect the ambiguity if any and to find the most specialized method otherwise. If no applicable method exists, NIL is returned. This is referred to as the d-ary dispatching problem henceforth.

The case of d=1 is the single dispatching problem faced in currently popular OO languages such as C++ and Smalltalk in which all methods have only one dispatchable argument, even if they might have a number of other arguments. The case d>1 arises in the next generation of OO languages, as explained above. The relevant parameters are n, the number of nodes in the class hierarchy, M, the number of distinct method names, m, the number of methods in all, and d, the number of arguments involved in the dispatching operation. Note that $m \leq Mn^d$ and typically it is much smaller, and $M \leq m$ trivially.

Some results are known and are summarized in Table 1 below. The d=1 case is illustrative. One solution is to tabulate the answers to all possible queries and look up the solution when needed; this is referred to herein as Algorithm A. This uses O(nM) table space and takes O(1) time per query but the space is prohibitively large for existing hierarchies. To cope with this, known practical solutions use the following observation: many s(A) queries return NIL. Thus they employ various heuristics to compress the non-NIL entries of the table so the query time remains small. The best known theoretical bound for the d=1 case is linear space, i.e., O(n+M) and O(log log n) query time. Another algorithm, referred to herein as Algorithm B, is described in S. Muthukrishnan and W. Muller, Time Space Tradeoffs for Method Look-up in Objected Oriented Programs, Proc. 7th ACM Symp. On Discrete Algorithms, 1996, which is hereby incorporated by reference into this application.

For the d>1 case, Algorithm A uses table space $O(Mn^d)$. Thus there is a combinatorial explosion in the space used as d increases. Since even the d=1 case uses prohibitive amount of space, this solution is clearly useless for $d \geq 2$. However, the d=2 case is not well understood and effective heuristics for table compaction schemes or for using proper automaton to prune the search space are still open.

Best known theoretical results are summarized in the following Table 1.

TABLE 1

| Case | Algorithm | Space | Query Time |
|---|---|---|---|
| d > 0 | A | $O(Mn^d)$ | O(1) |
| d = 1 | B | O(n + m) | O(log log n) |

There is therefore a need for a method for solving the multi-method dispatch problem in an efficient manner.

SUMMARY OF THE INVENTION

In accordance with the invention, the multi-method dispatching problem is reduced to geometric problems on multi-dimensional grids and new data structures are designed to solve the resulting geometric problems. The multi-method dispatching problem is mapped to a geometric problem referred to as the point enclosure problem, in which each possible method invocation is mapped to a n-dimensional rectangle, where n is the number of arguments in the methods, and a particular method invocation in a program is mapped to an n-dimensional point. The smallest rectangle which encloses the point is the most specific method to use for the given method invocation.

In particular, methods having the same name are mapped to a set of rectangles based on a pair of numbers associated with each argument. The pair of numbers is an interval or set of first and last numbers identifying the position of the argument in a class hierarchy tree. The interval may be found by computing an Euler Tour of the class hierarchy tree, the Euler Tour being a technique for sequentially assigning numbers to each node in the class tree as the tree is systematically traversed.

For a given method invocation in an OO program, the method invocation is mapped to a point based on one of the numbers in the interval associated with each argument in the invocation. The problem of finding the most specific method for the method invocation is thus transformed into the so-called point enclosure problem in geometry, in which the smallest rectangle is found which encloses a given point.

To help find efficient solutions to the point enclosure problem, the set of rectangles is broken into a number of subsets having certain geometric properties and stored in efficient data structures. Queries are performed on the various data structures to find the smallest or minimal rectangle, if any, in the various subsets. The result is either the identification of the minimal rectangle overall, or of an ambiguity requiring resolution by the programmer.

The geometric results described herein have other applications as well. In particular, they are also applicable to improve the best known bounds for the problem of multiple matching with rectangular patterns in combinatorial pattern matching.

BRIEF DESCRIPTION OF THE DRAWINGS

The invention is illustrated in the figures of the accompanying drawings which are meant to be exemplary and not limiting, in which like references refer to like or corresponding parts, and in which.

DETAILED DESCRIPTION OF THE PREFERRED EMBODIMENTS

In accordance with the invention, the multiple dispatching problem is abstracted as a geometric problem in a d-dimensional space. The process of converting the multiple dispatching problem to a geometric problem and solving the geometric problem is implemented in a computer program executing on a computer, such as a personal computer upon which an OO program is stored and being complied. The computer program may be a separate program or may be part of a compiler for the OO language used.

Preferred embodiments of the invention are now described with reference to the drawings in the Figures.

Figure 1:
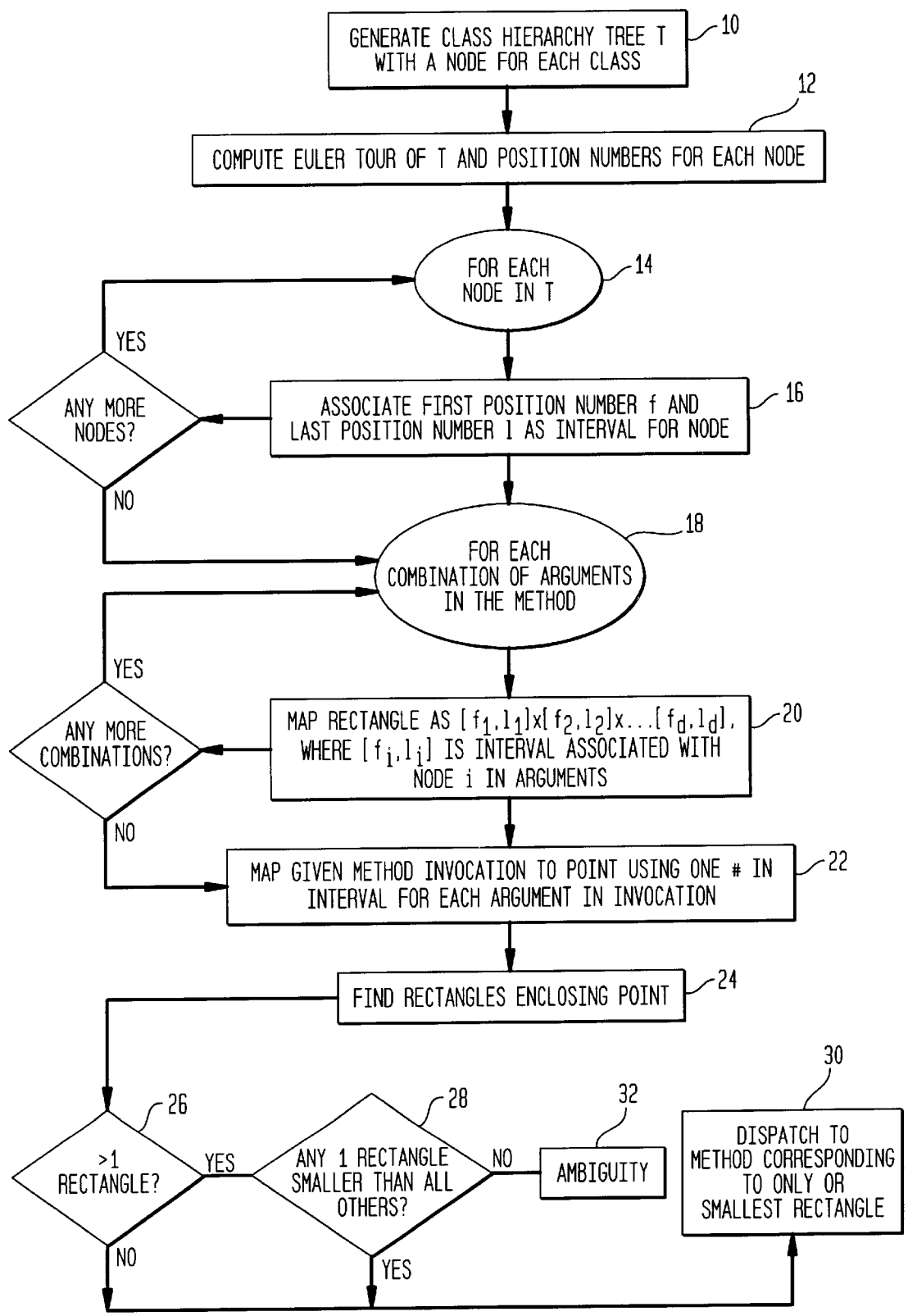
FIG. 1 is a flow chart showing a process for handling multi-method invocations in accordance with one preferred embodiment of the invention.

Referring to FIG. 1, the process begins by generating a class hierarchy tree T having nodes for the classes represented as arguments in the methods, step 10. The Euler Tour of T is computed, step 12. As understood by one skilled in the art, an Euler Tour is a technique for traversing a graph, tree, or other data structure in which numbers are assigned in sequence to each item as it is systematically traversed.

For each node in T, step 14, the interval [f, l] with each node (class) which occurs in the Euler Tour first at the fth position and lastly at the lth position is associated with the node, step 16. All method names are handled independently; here, the focus is on a single method name s. A set R of rectangles is built, steps 18 and 20, by mapping any method $s(A_1, A_2, \ldots, A_d)$ to the rectangle $r=[f_1, l_1]\times[f_2, l_2]\times \ldots \times[f_d, l_d]$, where $[f_i, l_i]$ is the interval associated with argument $A_i$, for all $1 \leq i \leq d$. A d-ary invocation $s(B_1, B_2, \ldots, B_d)$ is now a point enclosure problem on the set of rectangles R (denoted PER problem). The rectangle is actually an hyper-rectangle (i.e., d-range) when d>2. For simplicity of exposition, the terms rectangle and hyper-rectangle may be used interchangeably.

During compilation of a computer program having multi-methods, a specific method invocation $s(B_1, B_2, \ldots, B_d)$ is mapped to a d-dimensional point $P=(x_1, x_2, \ldots, x_d)$, where $x_i$ is one of the two numbers associated with node $B_i$, step 22.

The most specific method for $s(B_1, B_2, \ldots, B_d)$ is the smallest rectangle in R that contains P. The multi-method compiler thus finds all rectangles enclosing the point P, step 24. If only one such rectangle is found, step 26, or if multiple rectangles are found and one is smaller than the rest, step 28, the one rectangle or the smallest rectangle is mapped back to arguments and the method invocation is dispatched to the corresponding method, step 30.

If more than one rectangle is found to enclose the point P and no one is the smallest, an ambiguity results, step 32, and an error declared.

The presence of an ambiguity for the invocation $s(B_1, B_2, \ldots, B_d)$ corresponds to the existence of a confusable set of rectangles. A set of rectangles is confusable if it contains at least two rectangles in R, say r' and r", such that: (i) r' and r" contain the point P and neither of them encloses the other completely; (ii) there does not exist any rectangle in R that contains P and is completely enclosed in both r' and r". To summarize, the d-ary dispatching involves detecting the existence of a confusable set for the point P in R, and in the absence of any such set, finding the smallest rectangle in R that contains P.

Figure 2A:
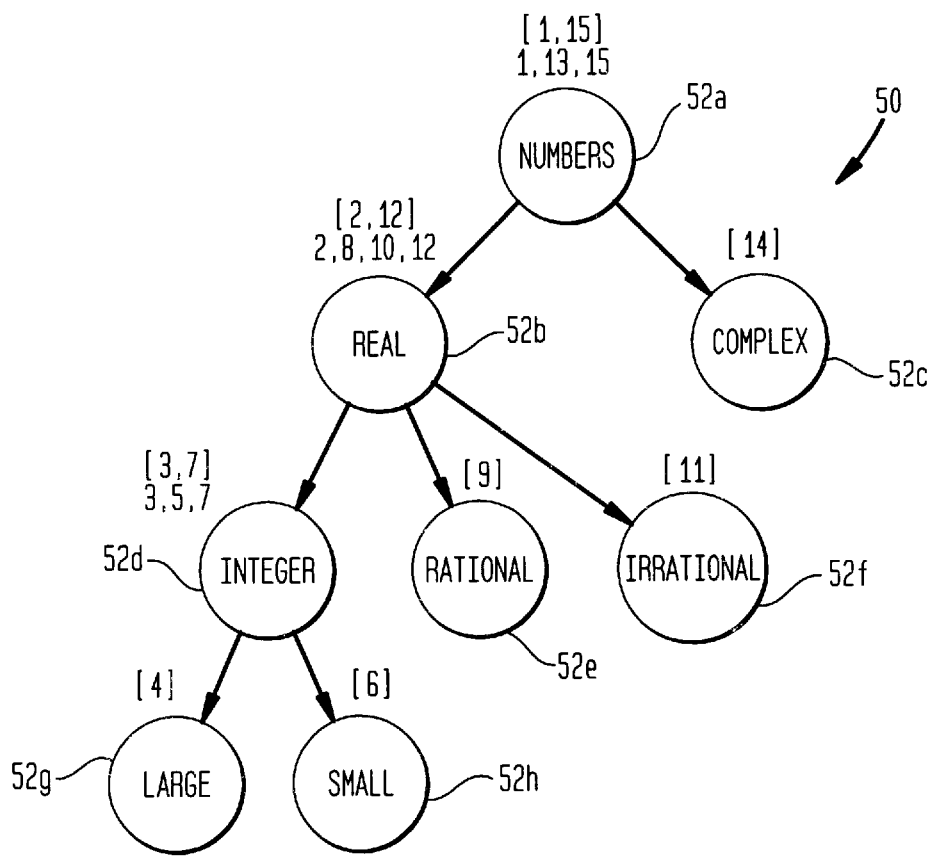
FIG. 2A shows an exemplary Euler Tree generated as part of the process shown in FIG. 1.
Figure 2B:
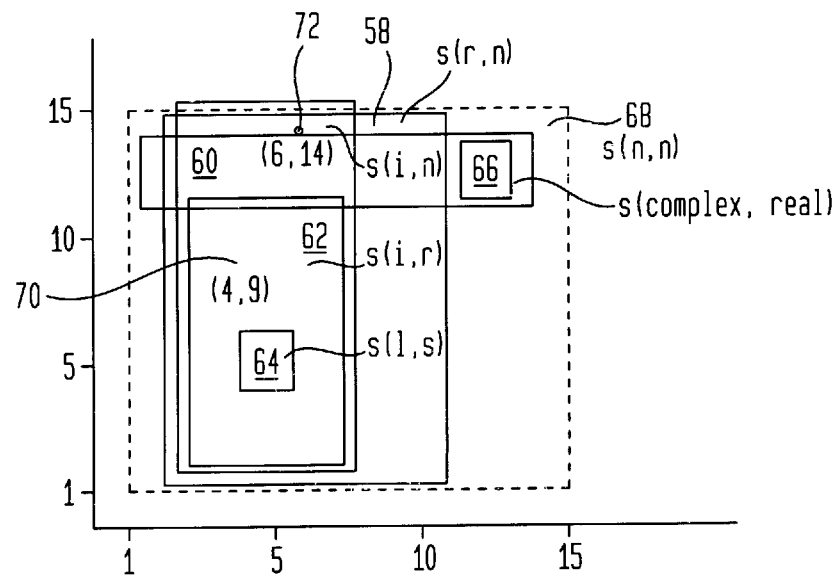
FIG. 2B shows exemplary rectangles generated for various node in the Euler Tree in FIG. 2A in accordance with the process shown in FIG. 1.

An example of the process described above is given with reference to FIGS. 2A and 2B. A method such as add ($arg_1$, $arg_2$) takes numbers as arguments. Many different functions with the name add may be provided, with differing functionality depending upon the types of numbers added. FIG. 2 shows a class hierarchy tree 50 containing nodes 52a–52h for each class of number. The classes include: number class 52a, which is the root node; real number class 52b, complex number class 52c, both descending from number class node 52a; integer, rational and irrational number classes 52d, 52e & 52f, respectively, descending from real number class 52b; and large integer class 52g and small integer class 52h.

An Euler Tour has been generated for tree 50, and the position numbers for each node listed by the node. Also listed by each node is the interval [fl] representing the first and last numbers for the node in the Euler Tour.

A mapping of rectangles from some of the intervals of FIG. 2A is shown in FIG. 2B. The rectangles include: the mapping of add (real, number) 58; the mapping of add (integer, number) 60; the mapping of add (integer, real) 62; the mapping of add (large, small) 64; the mapping of add (complex, real) 66; and the mapping of add (number, number) 68, which is the largest possible rectangle in the set.

As shown in FIG. 2B, a method invocation is mapped to a point in the same space. For example, a method invocation of add (large integer, rational) is mapped to point (4,9) 70, while a method invocation of add (small integer, complex) is mapped to point (6,14) 72. Looking at point (4,9) 70, it can be seen that the smallest rectangle enclosing the point 70 is add(integer, real) 62, and thus the method invocation is dispatched to the method in the real class, the most specific method. Similarly, the point (6,14) 72 is dispatched to the number class. It should be noted in FIG. 2B that rectangles having colinear sides are shown skewed for clarity purposes.

The point enclosure problem is well known to those of skill in the art. The prior solutions required a reporting of all the rectangles in a given set that contain an arbitrary query point P. Known algorithms can only report these rectangles in some arbitrary order and scanning that list to find the smallest one, or detecting the presence of a confusable set, is expensive (possibly $\Omega(m)$ query time). One such result does return the smallest rectangle enclosing P but that works only under the assumption that intersecting rectangles are totally ordered in being enclosed in each other, which does not clearly apply to the problem presented for multi-method dispatching.

The PER problem presented herein has two specialties: (1) The rectangles in R are nested, that is, the intervals obtained by projecting them onto one of the d dimensions are nested. (2) The corner-points of the rectangles in R are integers drawn from a bounded universe 1 ... O(n). At the high level, the algorithms described herein rely on partitioning R into several subsets, and employing the two specialties above for developing suitable variants of certain data structures known in computational geometry for each partition. In particular, for the general d-ary dispatching, use is made of the former property and the key idea of partitioning rectangles based on their area to get polylogarithmic query time. For the d=2 case, to get sub-logarithmic query times use is made of the second specialty and variants of powerful data structures for limited Universe data sets, such as those described in articles including P. van Emde Boas, R. Kaas, and E. Zijlistra, Design and Implementation of an Efficient Priority Queue, Mathematical Systems Theory, 10:99–127, 1977, and M. H. Overmars, Computational Geometry on a Grid: an Overview, NATO ASI Series, vol. F40, 167–184, 1988, both of which are hereby incorporated by reference into this application.

Since a fixed, small universe $U=O(n)$ is involved, advantage can be taken of some known results that exploits the power of the Random Access Machine (RAM) model.

Let V be a set of N keys drawn from U. A Van Emde Boas (VEB) tree built on V uses O(N) space and, for any given key K, determines the largest key in V smaller than K (or, the smallest key in V larger than K) requiring O(log log U) time. VEB trees are described in the article by P. van Emde Boas et al. referenced above.

Given a set S of N points in the plane, a 3-sided range query on S consists of retrieving all points in S that lie in the region $[A_1, B_1]$ times $[A2,+\infty]$. It is possible to prove the following: Given a set of N points in $U^2$, they can be stored in a Priority Search Tree (PST) using O(N) space such that 3-sided range queries can be answered in time O(log log U+k), where k is the number of reported answers.

A brief description of a segment tree data structure is now provided. A more detailed description of a segment tree data structure appears in F. P. Preparate and M. I. Shamos, *Computational Geometry*, Springer-Verlag, 1985, which is hereby incorporated by reference into this application. Given a set S of N segments, a segment tree T built on S is a balanced binary tree with N−2 internal nodes and N−1 leaves. Each leaf u corresponds to an interval I(u) between consecutive endpoints of the segments in S. Each internal node v is associated with the interval I(v) formed by the union of the elementary intervals of the leaves in the subtree of v. Given a segment s∈S, s is stored in all the nodes w of T (they are at most O(log N) such nodes) such that s contains I(w) but not I(parent(w)). The set of all segments stored at node u is denoted by S(u). The segment tree T can be used to efficiently retrieve all segments in S that contain a query point p, by simply returning all the segments stored at the nodes on the downward path connecting the root of T to the leaf u such that p∈I(u). The cost is O(log N+k), where k is the number of reported segments.

The simple case considered first is where T is a path, that is, the classes are totally ordered. Given the numbering of T's nodes as described earlier, the second number assigned to node u is denoted by num(u). Then, num(u)>num(v) if and only if u precedes v in the path T. Therefore, each method s(u,v) is mapped to the two-dimensional point (num(u), num(v)) (instead of to a rectangle). The notion of most specific method now relates to a known concept in computational geometry, that is, rectangular visibility. Given a set of points S in the plane, a point p is said to be "rectangularly visible" from a point q (with respect to S) if and only if the rectangle with p, q as opposite vertices and q as lower-left corner, does not contain any other point of S. A more general definition of rectangular visibility is provided in several articles, including J. I. Munro, M. H. Overmars, and D. Wood, Variations on Visibility, Proc. ACM Symp. Comp. Geometry, pp. 291–299, 1987, M. H. Overmars and D. Wood, On Rectangular Visibility, Journal of Algorithms 9, pp. 372–390, 1988, and M. T. De Berg, S. Carlsson, and M. H. Overmars, A General Approach to Dominance in the Plane, Journal of Algorithms 13, pp. 274–296, 1992, all of which are hereby incorporated by reference into this application.

Defining V as the set of points corresponding to the methods implementing a given method name s, it can be easily proved that: Solving the 2-dispatching problem on query s($A_1$, $A_2$) is equivalent to checking if the point in V rectangularly visible from (num($A_1$), num($A_2$)) is unique or if there are in V many rectangularly visible points from num($A_1$), num($A_2$)). Modifying known results for the rectangular visibility problem and summing up over all method names, the result is that the 2-ary dispatching problem on a path can be solved in O(log m) time and O(m log m) space.

Use of the fact that the points are integers in the range 1 ... O(n) is made to get sub-logarithmic query time. In what follows an algorithm is described which solves the 2-ary dispatching problem in sub-logarithmic time.

Figure 3A:
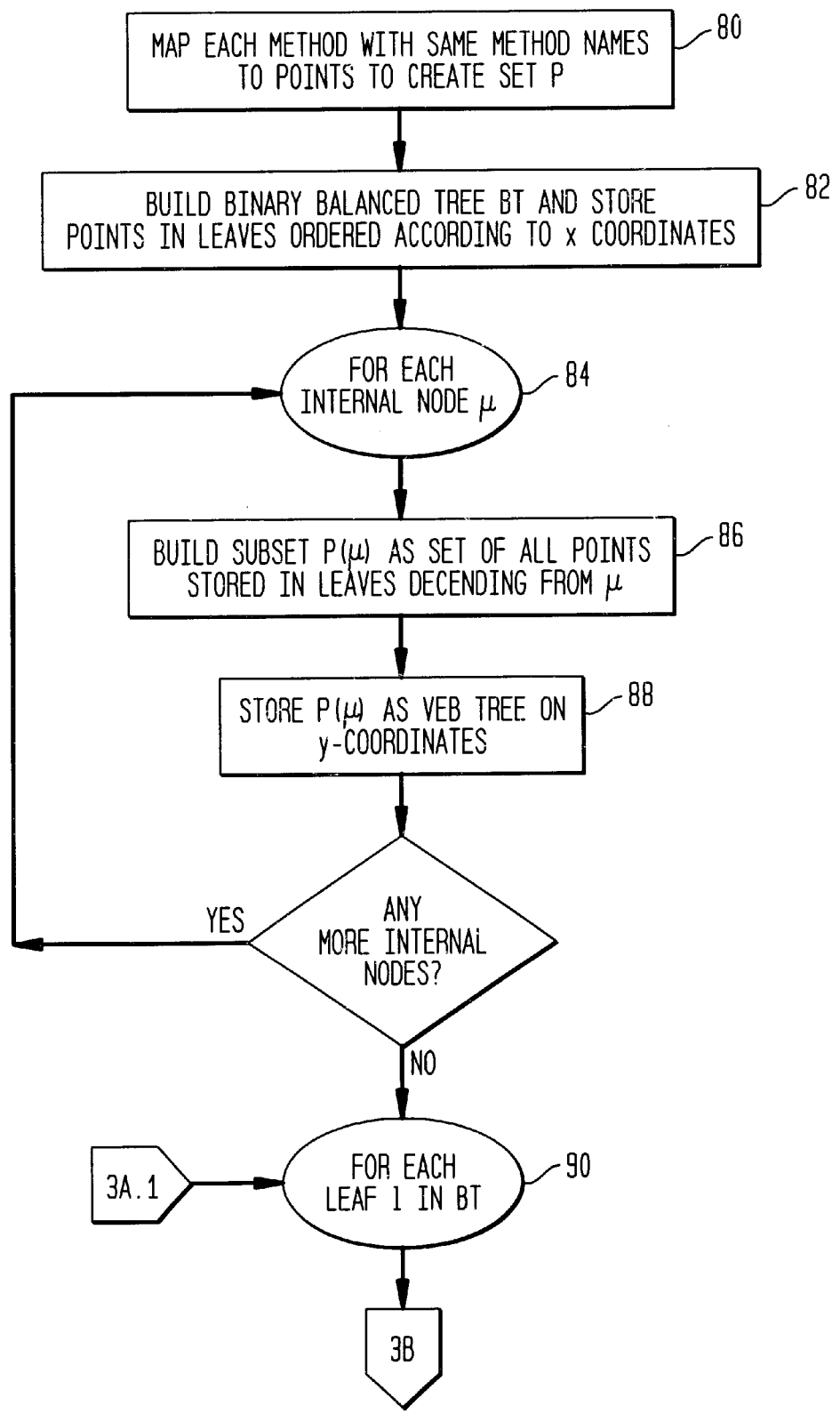
FIG. 3 is a flow chart showing a process for solving a 2-ary dispatching problem by finding a point which is rectangularly visible to the point representing the method invocation.
Figure 3B:
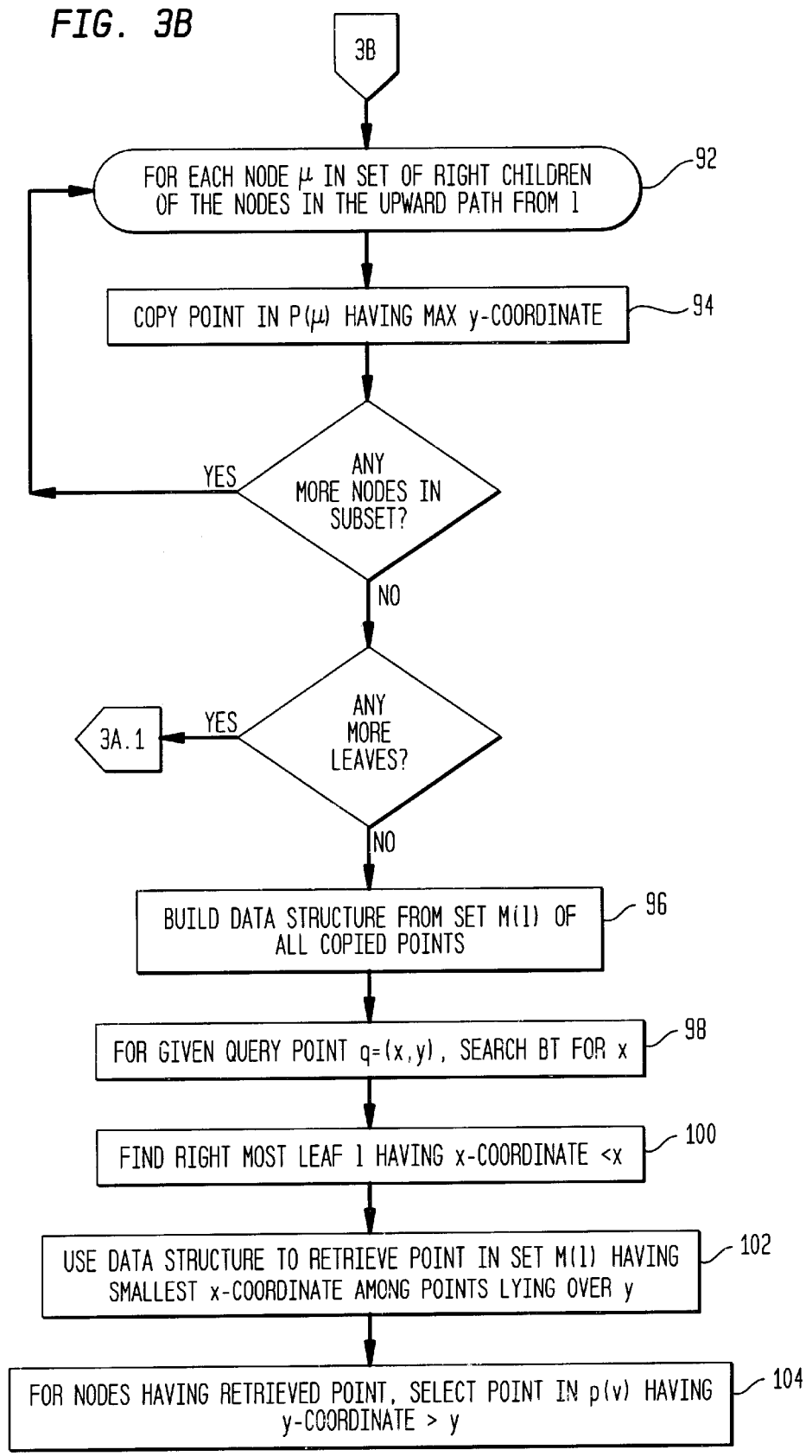

Referring to FIGS. 3A–3B, methods which implement the same method name s are mapped to points to create set P step, 80. A binary balanced tree BT is built and the points in the leaves are stored, ordered according to the x-coordinates, step 82. Given a leaf l∈BT, $\pi_1$ denotes the upward path from l and R(l) denotes the set of right children of $\pi_1$'s nodes which do not occur in $\pi_1$. BT is the augmented as follows. For each internal node U, step 84, P(u) is built as the set of all points stored in u's descendant leaves, step 86; this is stored as a VEB tree on the y-coordinates, step 88. For each leaf l, step 90, the set M(l) is built which is obtained by copying from each node u∈R(l), step 92, the point in P(u) having the maximum y-coordinate, step 94 (hence, |M(l)|= O(log |P|)) A data structure on M(l) is built, step 96, (denoted by D(l)) such that the following query can be answered in O(log log |P|) time: Given a point p=($x_0$, $y_0$), among the points in M(l) having y-coordinate larger than $y_0$, find the one having the smallest x-coordinate. The total space occupied by the augmented BT is 0(|P| log |P|).

This data structure is an array that stores the points of M(l) (ordered rightward by their x-coordinate) and furthermore, it keeps into each position the maximum among the y-coordinates of the points stored in the previous positions of the array (like a Prefix-maxima). This way, the query above can be answered by a binary search on the (prefix)-maximum value.

Consider now a query point q=(x, y). A search is performed in BT for x, step 98 and the rightmost leaf l which stores a point with x-coordinate smaller than x is found, step 100. The point p' having the smallest x-coordinate among the ones which lie over y is then retrieved from M(l), step 102 (this is done by means of D(l)). It is easy to observe that the node v ∈R(l) containing p' actually identifies a vertical slab in the plane which contains the leftmost point of P dominating q. Then, the point in P(v) is selected, say p"=(x", y"), which has the smallest y-coordinate larger than y, step 104. This point is clearly rectangularly visible from the query point q. Hence, a check is performed if other rectangular visible points from q exists in P by performing two 3-sided range queries. Namely, a check is performed if the three-sided ranges (x",+∞)×(y, y") and (x, x")×(y",+∞) contain at least one point of P (see Section 2). If these ranges do not contain any point then P" is the unique point rectangularly visible from q; otherwise, there is an ambiguity. Summing up the complexities over all method names, it can be seen that the 2-ary dispatching problem on a path can be solved in O(log log n) time and O(m log m) space.

The correctness of this approach can be proved as follows. Since the nodes in R(l) partition the square ($x_0$,+∞) times ($y_0$,+∞) into O(log |P|) vertical slabs, the leaves descending from node v identify the leftmost of those slabs that contain a point in P dominating p. Since P" belongs to this leftmost slab (as the minimum dominant does) and its y-coordinate is the smallest in this slab, then it is a point rectangularly visible from p. Hence, if there exists just one point rectangularly visible from p wrt P, then this is p"; otherwise, all other points rectangularly visible from p will belong to the two 3-sided ranges/ described above.

An arbitrary hierarchy tree T is now considered. Many of the ideas seen so far for the case when T is a path will be useful. For convenience in presentation, each method s is assumed to have has a dummy definition s(r, r), where r is the root of the hierarchy tree; thus a query never returns NIL. The x-side (resp., y-side) of a rectangle r=[$x_1$, $x_2$]×[$y_1$, $y_2$], is defined as the interval [$x_1$, $x_2$] (resp., [$y_1$, $y_2$]); and the x-length of r is defined as the value ($x_2$−$x_1$+1) (resp. y-length the value ($y_2$−$y_1$+1)).

Figure 4A:
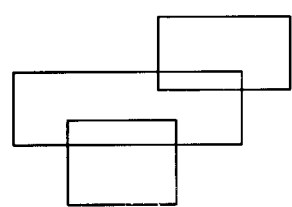
FIGS. 4A–4B show examples of sets of rectangles which do not (FIG. 4A) and do (FIG. B) satisfy the nesting property.
Figure 4B:
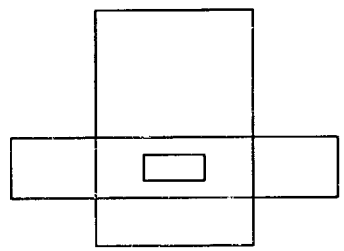

A set of intervals is said to satisfy the nesting property if for each pair of intervals $I_1$ and $I_2$, such that $I_1 \cap I_2 \neq 0$, it is either $I_1 \subset I_2$ or $I_2 \subset I_1$. A set of rectangles is also said to satisfy the nesting property if both their x-sides and y-sides satisfy the nesting property defined on intervals FIG. 4A shows a set of rectangles which fail to satisfy the nesting property, while FIG. 4B shows a set of rectangles which do satisfy the nesting property.

Furthermore, given a set R of rectangles and a two-dimensional point P, we define a rectangle r∈R as the smallest that contains P if all the other rectangles in R containing P (if any) completely enclose r. Also, we define a rectangle containing P as minimal if no other rectangle in R enclosing P is completely contained in r. Clearly, the smallest rectangle enclosing P is minimal, but the vice versa is not always true. Note that the smallest rectangle is unique and minimal. Also, if there exist two or more minimal rectangle, then the smallest one does not exist.

Figure 5A:
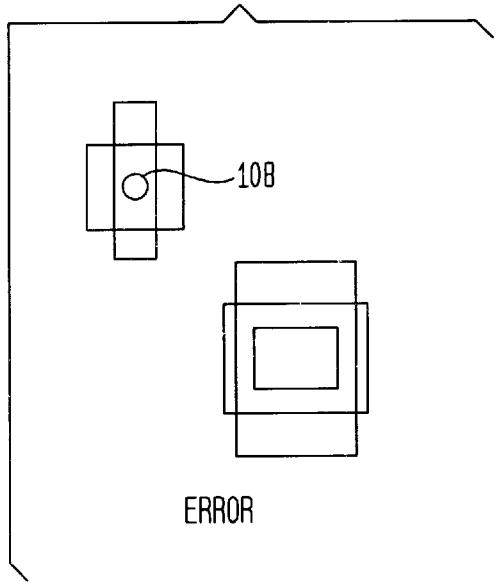
FIGS. 5A–5B show examples of sets of rectangles which do not (FIG. 5A) and do (FIG. 5B) contain a minimal rectangle enclosing a point.
Figure 5B:
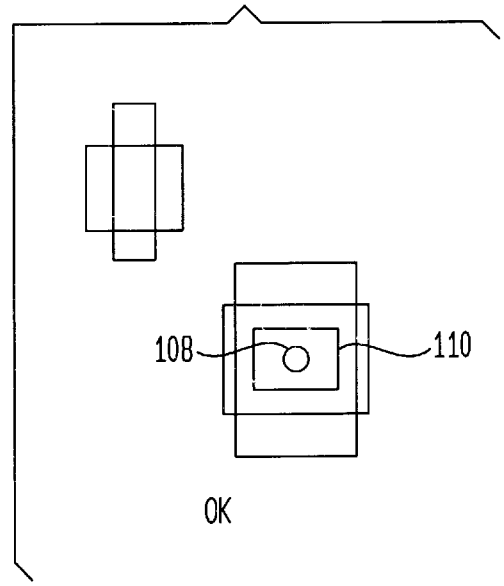

The PER Problem presented herein may be stated as follows: Let R be a set of r rectangles that satisfy the nesting property and have distinct integer coordinates drawn from a bounded universe 1 . . . U. It is desired to store R in order to efficiently answer the query: given a two-dimensional point P=(a, b), retrieve the smallest rectangle in R that encloses P (if any) or return ERROR if there exist two or more minimal rectangles in R for P. (Recall the existence of the dummy rectangle [1, U] times [1, U] that surely encloses P.) FIG. 5A shows a point 108 which is not enclosed by a single minimal rectangle, while FIG. SB shows a point 108 enclosed in smallest rectangle 110.

Figure 6A:
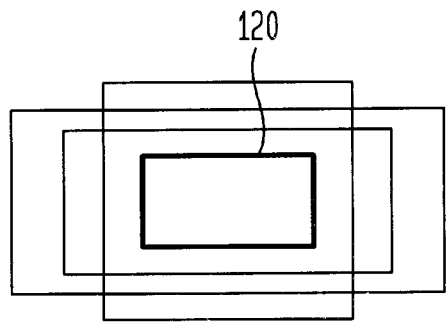
FIGS. 6A–6C show examples of sets of rectangles which fully overlap a given subdivision rectangle (FIG. 6A), overlap a given subdivision rectangle on only one side (FIG. 6B), and overlap a given subdivision rectangle on only one corner (FIG. 6C)
Figure 6B:
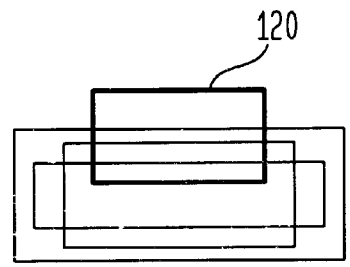
Figure 6C:
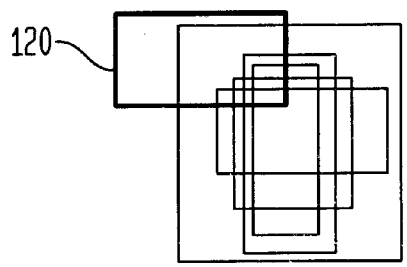
Figure 7:
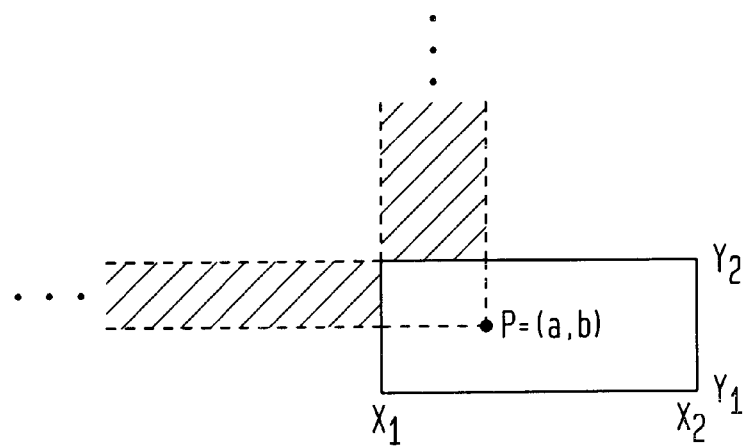
FIG. 7 shows regions searched for rectangles during a compare operation performed on a rectangle in the fully overlap group of FIG. 6A in accordance with the present invention.

In accordance with preferred embodiments of the present invention, the PER problem is solved by partitioning the set of rectangles R into subsets, storing the subsets as efficient data structures, and querying those structures to find a minimal rectangle. This process is described below with reference to FIGS. 6A–9, in which FIGS. 6A–6C graphically illustrate examples of properties of subsets of rectangles, FIG. 7 illustrates a compare function on one of the subsets, FIGS. 8A–8B illustrate the process of partitioning the set R and creating data structures, and FIG. 9 illustrates the process of querying the data structures to find minimal rectangles.

Figure 8A:
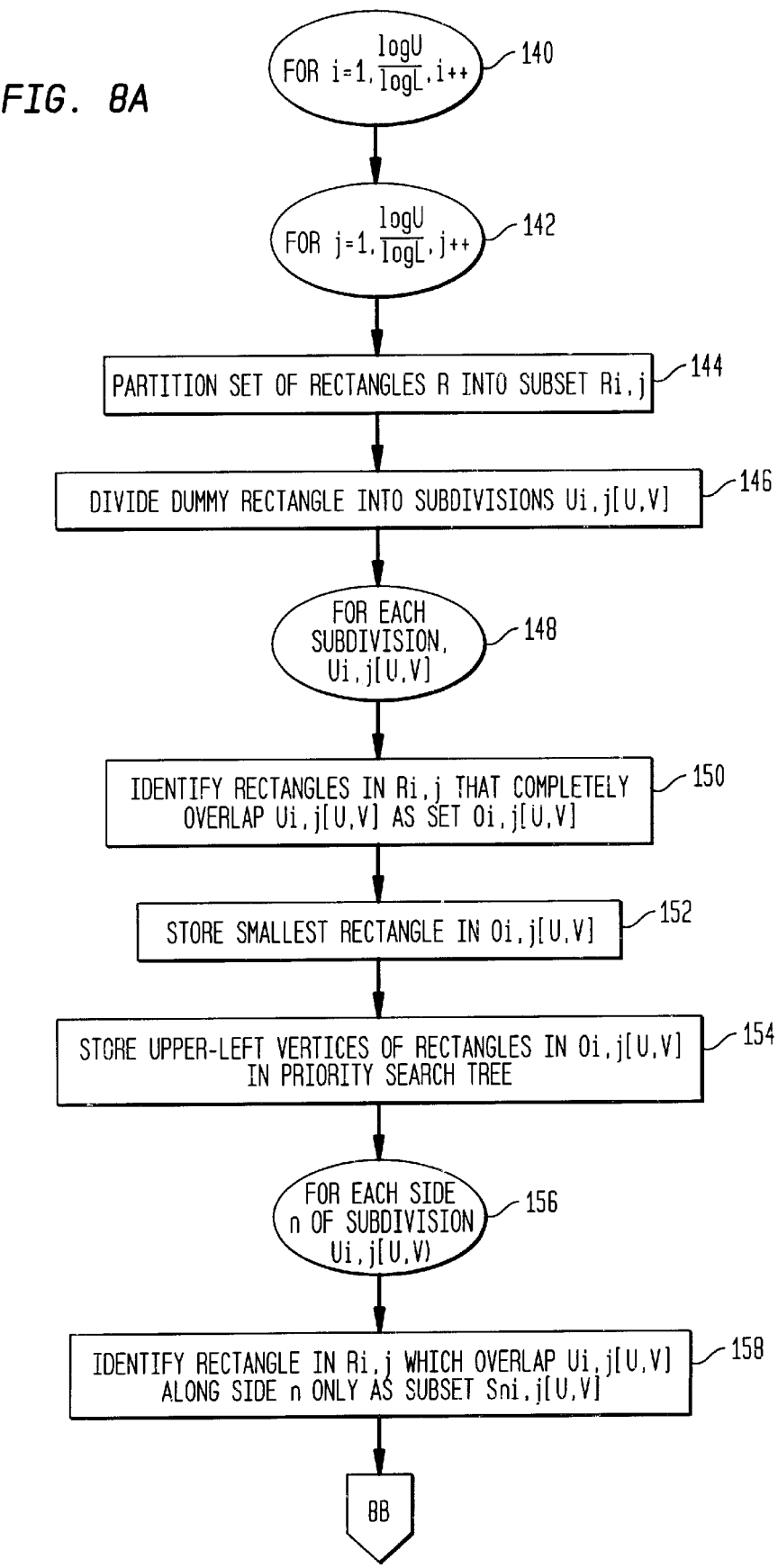
FIGS. 8A–8B contain a flow chart showing a process for by partitioning a dummy rectangle into subdivisions and classifying rectangles into subsets in accordance with their relation to the subdivisions in accordance with the present invention.
Figure 8B:
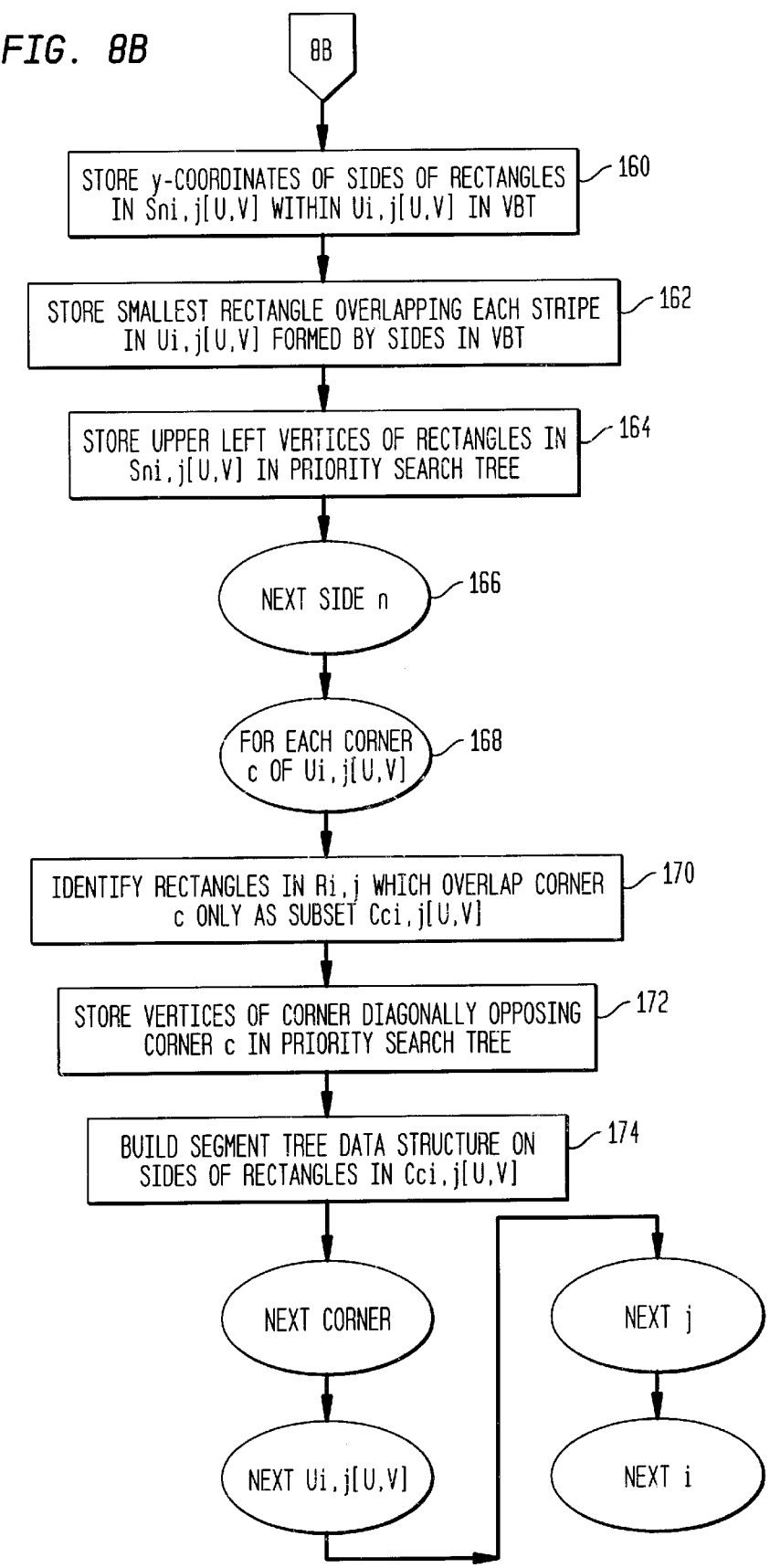
Figure 9:
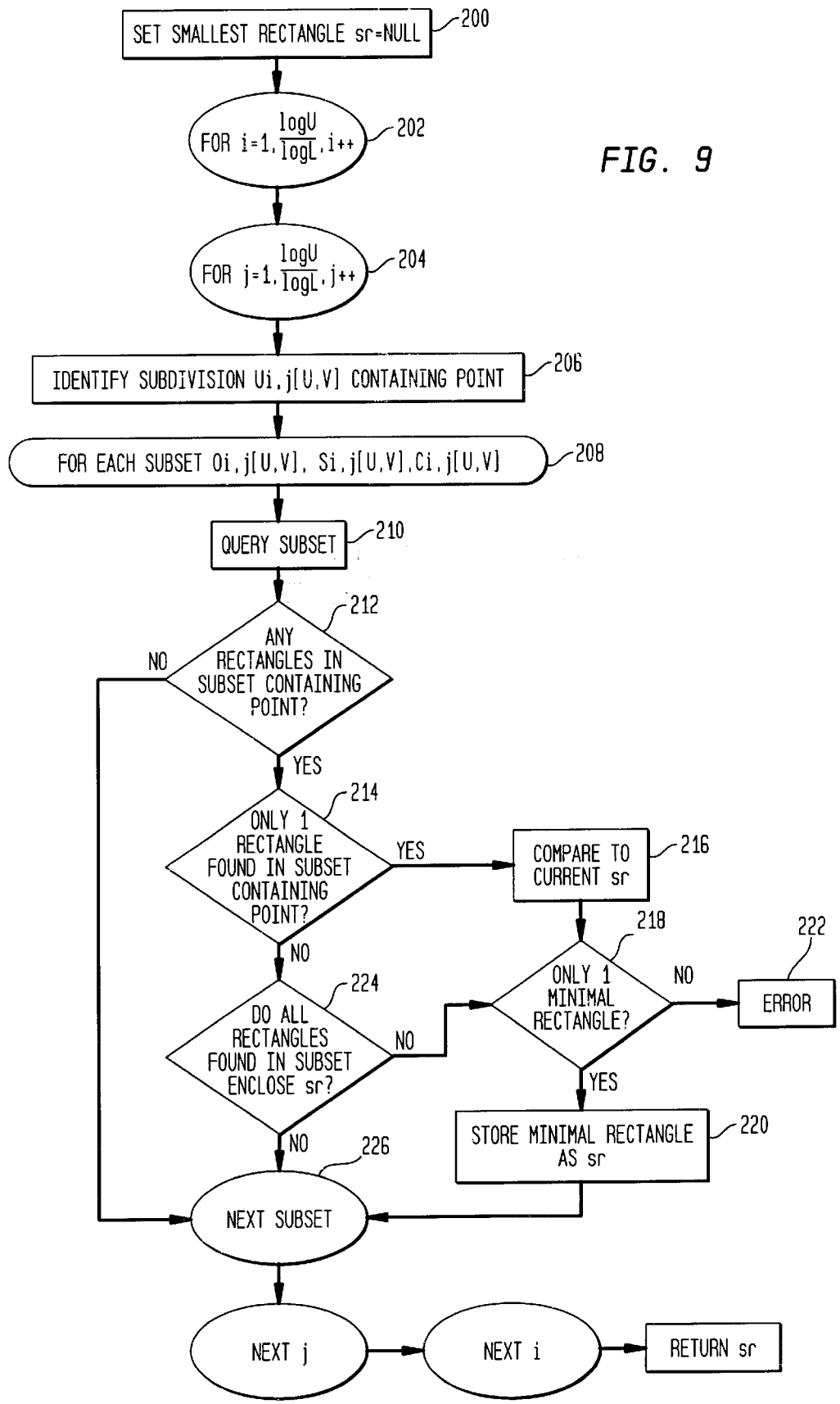
FIG. 9 is a flow chart showing a process for solving a 2-ary dispatching problem using the rectangle subsets created in the process shown in FIGS. 8A–8B.

The method for partitioning is shown in FIGS. 8A–8B. Let L>0 be a parameter to be fixed later. For each pair of integers i,j≧1, steps 140, 142, R is partitioned into $R_{ij}$, step 144, a subset of rectangles in R whose x-lengths lie in $[L^{i-1}, L^i]$ and whose y-lengths lie in $[L^{j-1}, L^j]$. The space $[1,U] \times [1,U]$ is partitioned into subdivisions $U_{ij}[u, v]$, step 146, defined by the rectangular regions $[(u-1) L^{i-1}, u L^{i-1}] \times [(v-1) L^{j-1}, v L^{j-1}]$. This way, the square $[1,U] \times [1,U]$ is being partitioned into non-overlapping subdivisions whose x-lengths and y-lengths are a power of L (when i=j these subdivisions are squares). Since ij≦(log U/log L), there are at most (log U/log L)² different subsets $R_{ij}$, and at most $O(U^2)$ subdivisions.

The rectangles in $R_{ij}$ and the subdivisions $U_{ij}$ are related as follows: Each rectangle in $R_{ij}$ has its vertices in distinct subdivisions of $U_{ij}$. The x-side and the y-side of a rectangle in $R_{ij}$ overlap no more than L subdivisions of $U_{ij}$. Each rectangle in $R_{ij}$ contains no more than $L^2$ subdivisions of $U_{ij}$.

The rectangles in $R_{ij}$ are classified as follows in steps 150–174. A rectangle in $R_{ij}$ may overlap a subdivision of $U_{ij}$ in one of three different ways, as illustrated by the exemplary sets in FIGS. 6A–6C. Hence, $R_{ij}$ is further partitioned as follows:

$O_{ij}[u,v]$ is the set of rectangles in $R_{ij}$ that overlap the subdivision $U_{ij}[u,v]$ completely, step 150. FIG. 6A illustrates a sample set of rectangles overlapping completely a subdivision 120. Since the rectangles in $O_{ij}[u,v]$ overlap each other, both their x-sides and y-sides are nested (due to the nesting of R's rectangles). Therefore, the smallest rectangle in $O_{ij}$, if any, is maintained, step 152, or the information that many minimal rectangles overlap this subdivision. In addition, all the upper-left vertices of the rectangles in $O_{ij}[u,v]$ are stored in a PST, step 154. The query supported on $O_{ij}$, Query-O, is: Given a point P∈$U_{ij}[u,v]$, retrieve either the smallest rectangle in $O_{ij}[u,v]$ that encloses P, or conclude that there are many minimal rectangles that contain P.

As a second classification, for each subdivision, step 156, $S_{ij}[u,v]$ is the set of rectangles in $R_{ij}$ that overlap the subdivision $U_{ij}[u,v]$ only along one side, step 158. FIG. 6B illustrates a sample set of rectangles overlapping a subdivision 120 on only one side. The 4 subsets of $S_{ij}[u,v]$ are distinguished according to the overlapped side. Namely, S1 (resp. S2, S3, S4) is the set of rectangles that overlap $U_{ij}[u,v]$ on its lower x-side (resp. left y-side, top x-side, right y-side, respectively). Note that the rectangles in $S1_{ij}[u,v]$ and $S2_{ij}[u,v]$ are non intersecting, and those in $S2_{ij}[u,v]$ and $S4_{ij}[u,v]$ are non intersecting. Here, focusing on $S1_{ij}[u,v]$, with identical data structures built on S2, S3 and S4, the upper x-sides of the rectangles in $S1_{ij}[u,v]$ induce a partition of $U_{ij}[u,v]$ into horizontal stripes ($|S1_{ij}[u,v]|$ in all). The y-coordinates of those upper x-sides are stored in a VBT, step 160, and for each stripe, the smallest rectangle is maintained which overlaps the stripe or the information that many minimal rectangles overlap the stripe, step 162. All the upper-left vertices of the rectangles in $S1_{ij}[u,v]$ are also stored in a PST, step 164. This allows the following general query on $S_{ij}[u,v]$, Query-S, to be answered: Given a point P∈$U_{ij}[u,v]$, determine if there exists at least one rectangle in $S_{ij}[u,v]$ that encloses P, and if so, retrieve either the smallest rectangle or conclude that there are many minimal rectangles that contain P. The process is repeated for each side of the subdivision, step 166.

$C_{ij}[u,v]$ is the set of rectangles in $R_{ij}$ that overlap the subdivision $U_{ij}[u,v]$ on a corner only, step 170. The 4 subsets of $C_{ij}[u,v]$ are distinguished according to the overlapped corner, step 168: C1 (resp. C2, C3, C4) is the set of rectangles that overlap the right-lower (resp. left-lower, left-upper, right-upper) corner of $U_{ij}[u,v]$. Focusing on $C1_{ij}[u,v]$ (identical data structures are built on C2, C3 and C4), by definition, only the upper-left vertices of the rectangles in $C1_{ij}[u,v]$ lie in $U_{ij}[u,v]$. A PST on those vertices, step 172. In addition, a variant of the segment tree data structure is built on the upper x-sides of the rectangles in $C_{ij}[u,v]$, step 174.

Those segments are denoted by I. Note that they lie on the plane and thus they have a height, namely, the y coordinate of any point in them. Furthermore, they cross the right y-side of the subdivision $U_{ij}[u,v]$, but do not cross the left y-side because a rectangle in $C1_{ij}[u,v]$ overlaps only the right-lower corner of the subdivision. These segments I are organized into a segment tree $T_I$. $T_I$ is then augmented as follows. The segments S(u) are sorted and stored in a node u in $T_I$ for decreasing height, and m(u) denotes the maximum height of the segments in S(u). Then, M(f) is constructed as a set of pairs (v,m(v)), one for every ancestor v of f. Since $|M(f)|=O(\log |I|)$, we can devise a simple data structure on M(f) (called D(f)) that given an integer and a leaf f in $T_I$, returns the deepest ancestor of f that contains a segment higher than y, in $O(\log \log |I|)$ time (details in the full paper). The total space occupied by (the augmented) $T_I$ is still $O(|I| \log |I|)$.

Since I's segments are derived from the x-sides of R's rectangles, they satisfy the nesting property. From this and from the structure of $T_I$, it can be proven that: (i) The intervals stored in the ancestors of some leaf f overlap the x-range I(f) of f entirely; (ii) For any point P∈I(f), the intervals in I containing P are stored in some ancestors of f; and finally, (iii) For any two-dimensional point (a,b), the smallest interval in I containing a and lying over b is stored in the deepest ancestor u of a leaf f such that a∈I(f) and m(u)=b (proof in the full version). These three properties are exploited to answer efficiently the following query, Query-C1: Determine if there is at least one rectangle in $C1_{ij}[u,v]$ that contains the query point P and if so, retrieve either the smallest rectangle containing P or establish that there are many minimal rectangles that contain P.

From the partitioning property, it immediately follows that each rectangle is replicated $O(L^2)$ times in all of S's, C's and O's. Therefore, no more than $O(n\ L^2)$ items need to be stored (i.e., duplicated rectangles) altogether. Let us now describe our set of data structures. We will use a Priority Search tree to answer three-sided range queries efficiently. However, we will not list all the points falling in the queried boxes, but we will only check the existence of at least one point in them. This type of answer pays (loglog+1) time and can be used in combination with other data structures (described below) to check the existence of many minimal rectangles in that time bound. It is difficult to establish directly the existence of many minimal rectangles. Hence this problem is solved by first finding an approximate solution and then refining it, based upon the partition of the rectangles in the above three sets. Namely, a minimal rectangle (possibly it is the smallest one) is first found and then a three-sided range query is performed to check the existence of other minimal rectangles.

A Basic Operation used in finding minimal rectangles using the data structure described above is Compare(P, r, S). In what follows the following query need be answered: Given a point $P=(a,\ b) \in U_{ij}[u,v]$ and a rectangle $r=[x_1,x_2] \times [y_1,y_2]$, find out if there exists another rectangle in the set S that contains P and which does not contain r. Notice that S may be $O_{ij}[u,v]$ or $S_{ij}[u,v]$ or $C_{ij}[u,v]$. Here Compare is described for $O_{ij}[u,v]$ and works the same for the other subsets, as recognized by one skilled in the art. It is asked whether or not there exists at least one upper-left vertex of a rectangle in $O_{ij}[u,v]$ which lies in the stripes $[x_1,a]$ times $[y_2,\infty]$ or $[b,y_2] \times [-\infty,x_1]$. See FIG. 7. This can be done using a PST in sub-logarithmic time.

It is now described how to answer the query in PER on a point P=(a,b) with reference to FIG. 9. We scan R's partition for i=1, 2, . . . , (log U/log L), step 202, and for each value i, we examine j=1, 2, . . . , (log U/log L), step 204. At a generic iteration (fixed i,j), we identify the unique subdivision $U_{ij}[u,v]$ that contains the query point P, step 206. It is easy to prove that it suffices to stop the scanning process as soon as we discover that at least two minimal rectangles contain P in some set $R_{ij}$ because we proceed for increasing i and j. We inductively keep the smallest rectangle containing P found thus far. We denote this rectangle by sr (initially, sr=NULL, step 200). At a generic iteration (i.e., subdivision), we process the corresponding sets of rectangles $C_{ij}[u,v]$, $S_{ij}[u,v]$ and $O_{ij}[u,v]$, step 208, by answering Query-C, Query-S and Query-O, respectively, step 210. Let S be one of these three sets and call Query( S) the corresponding query operation. We have three cases:

(1) If the Query(S) operation establishes that no rectangles in S contain P, step 212, nothing needs to be done and we process another set from $C_{ij}[u,v]$, $S_{ij}[u,v]$ and $O_{ij}[u,v]$, step 226.

(2) If the Query(S) operation returns only one rectangle which is indeed the smallest one in S that encloses P, say sr', step 214, then this rectangle is compared to the current sr, step 216. If sr ⊂ sr' and sr' ⊂ sr, step 218, then we found at least two minimal rectangles enclosing P and thus we return ERROR, step 222; otherwise, we proceed after updating sr appropriately, step 220.

(3) If the Query(S) operation discovers that there exist many minimal rectangles that contain P, step 224, then we execute Compare(P,sr,S). This allows us to find out either if those rectangles enclose sr (then we go on processing another set), or if there exist many minimal rectangles enclosing P, step 218, in which case we return ERROR, step 222. By means of Compare, we do not examine explicitly those rectangles, which could be costly, but instead we exploit the answers to proper 3-sided range queries.

If we scan all the values of i and j without returning ERROR, then we return sr which is surely not Null because of the existence of the big dummy rectangle. This means that we are examining rectangles of R for larger and larger x-lengths, and for a give range of x-lengths, we examine the rectangles for longer and longer y-sides. In fact, since we are processing the rectangles for longer and longer x-sides, we can conclude that no rectangle will be found later on which is enclosed in the two retrieved ones (by the nesting property), and thus nothing can contradict our early conclusion. Hence, if at least two minimal rectangles are found, then the ERROR answer is immediately returned. The main problem is to determine these two witnesses. Clearly, the two rectangles we are speaking about, may belong to different subsets of R. If ((sr=NULL) or (sr'∈sr)), then sr:=sr' and we process another set. If instead sr∈sr' (sr is still the smallest one), we go on by processing another set. In all other cases, we have found that at least two minimal rectangles exist (i.e., sr and sr'), and thus the process is stopped by returning ERROR.

The complexity of the process is now discussed. Recall that U=O(n) because of the size of T, and $r \leq U^2$ because from our reduction there are at most $U^2$ methods (i.e., rectangles) implementing the same method name s. The query time of the procedures Query(S) and Compare is O(log log n) by using VEB and PST. Therefore, the total cost of answering a query is $O((\log n + \log L)^2 \log \log n)$. The total required space is $O(n^2+rL^2)$. The space is further reduced by storing only the subdivisions whose data structures contain some information (by means of VEBs); the query cost increases by an additive O(loglog n) term per iteration. This implies that we store no more than $O(rL^2)$ subdivisions (and rectangles) and keep no more than $O((\log n + \log L)^2)$ VEBs, one for each pair (i,j). The overall required space is now $O(rL^2+(\log n + \log L)^2)=O(rn^\epsilon)$ if we set $L=n^{\epsilon/2}$. The query time is still O(loglog n). If, instead, $L=2(\log n)^\gamma$, where $\gamma \in [1/2, 1]$, the needed space is $O(rn^{o(1)})$ and the query time is now $O(\log^\epsilon n)$, where $\epsilon=2-2\gamma<1$. Summing up over all method names, the result obtained is that the 2-ary dispatching problem can be solved either in O(loglog n) time and $O(mn^\epsilon)$ space, or in $O(\log^\epsilon n)$ time and $O(mn^{o(1)})$ space, for any given positive constant $\epsilon<1$.

The general case of d-ary dispatching is now addressed. Say R is the set of rectangles in the d-dimensional space (d-ranges) that correspond to the methods with name s, and let r=|R|. The data structure used here is a segment tree augmented with information related to the area of the d-ranges in R; this augmentation proves crucial.

The data structure for the d-ary case and the process for generating the data structure is now described. The process starts with a classical data structure for solving the d-dimensional point enclosure problem, such as the data structure disclosed in F. P. Preparata and M. I. Shamos, *Computational Geometry*, Springer-Verlag, 1985. It is defined recursively as follows: $T_d(R)$ is obtained by projecting the d-ranges of R onto one of the axes, referred to as the x-axis, and organizing these projections in a segment tree. That is, each node v is associated the set of d-ranges in R, called S(v), whose projections cover I(v) but not I(parent (v)). Also stored in v is a pointer to the structure $T_{d-1}(z)$, where V is the set of (d−1)—ranges obtained by projecting S(v) on the hyperplane normal to the x-axis (each (d−1)—range is still associated with its originating d-range). The recursion is stopped when d=1, that is, when the V-sets are composed of linear intervals. The total required space is $O(r \log^d r)$ because every (copy of a) d-range in R is replicated at most O(log r) times at each recursive level.

This data structure is sufficient to determine all d-ranges in R enclosing a query point. Nevertheless, their number can be too large to afford to scan them to solve the d-ary dispatching problem described herein. Here the idea of area of a d-range proves helpful.

The last level (i.e., d=1) of the recursive data structure described above is augmented as follows. Let u be a node of some segment tree at the last level. The d-range in S(u) having the smallest area is computed and denoted by $r_{min}(u)$. If there are many such d-ranges, any one is selected. Furthermore, $E_i(u) = \{[a_i, b_i]: \forall:[a_1,b_1]X \ldots X [a_i,b_i]X \ldots [a_d,b_d] \in S(u)\}$ is built, which is the projection of all d-ranges on the i-th dimension. It is a set of nested intervals. Built on the intervals of $E_i(u)$ is a balanced binary tree that allows us to retrieve the smallest interval in $E_i(u)$ enclosing a given query point in O(log r) time.

Answering a query on point q. The segment tree $T_d(R)$ is visited by using the x-coordinate of q, and then the algorithm is applied recursively on each of the $T_{d-1}(v)$'s encountered. At the last level of the recursion, a set $L_q$ is identified of $O(\log^d r)$ nodes storing a set of d-ranges that surely enclose q. The smallest-area d-range is taken from each node in $L_q$ (there are $O(\log^d r)$ in total) and then the d-range is computed, called $r_{min}$, having the smallest area among them. If there are many such d-ranges, just one of them is selected. This takes $O(\log^d r)$ time. It may be observed that the d-range $r_{min}$ is either the smallest d-range in R enclosing q or it belongs to a confusable set.

What remains is the problem of checking the existence of a confusable set. For each node $v \in L_q$ and for each dimension i=1, ..., d, the smallest interval in Ei(v) is determined which encloses the point given by the i-th coordinate of q. Let r' be the d-range whose projection originated this interval (in $E_i(v)$). If r' does not strictly contains $r_{min}$ anyway, it contains q by definition, then a confusable set does exist. If the end of the iteration is reached without this scenario occurring, it can be concluded that $r_{min}$ is the smallest d-range in R enclosing q. The correctness of this approach can be proved by exploiting the nesting property among the d-ranges of R and the observation above. The query time turns out to be $O(d \log^{d+1} r)$ because each step of the loop above takes O(log d) time to retrieve r'. Nevertheless, the query time can be reduced to $O(d \log^d r)$ by adopting the Fractional Cascading technique on the nodes of $L_q$ that belong to the same segment tree. The Fractional Cascading technique is disclosed, e.g., in B. Chazelle and L. J. Guibas, Fractional Cascading I: A Data Structuring Technique, Algorithmica, pp. 133–162, 1986, which is hereby incorporated by reference into this application.

Summing up over all method names, one can conclude that the d-ary dispatching problem can be solved in $O(d \log^d m)$ time and $O(m \log^d m)$ space for any $d \geq 2$.

As described above, new processes and data structures are disclosed herein with a number of tradeoffs between space and query time. The main results are described below.

The first result is for the case d=2. As shown herein, 2-ary dispatching can be solved with $O(mn^\epsilon)$ space and O(loglog n) query time, or with $O(mn^{o(1)})$ space and $O(\log^\epsilon n)$ query time; here $\epsilon < 1$ is any fixed positive constant.

The case of d=2 is a strong generalization of the single dispatching case both conceptually and algorithmically. Conceptually, the nature of OO programming changes when d=2 or larger. No nontrivial algorithmic results are known for the d=2 case and considerable effort is needed to obtain the result above. Note that in one of the results, the same query time is obtained as the best known bound for the classical d=1 case while the space is kept subquadratic.

For the general case of d-ary dispatching, a process is described herein that uses $O(m \log^d m + n)$ space and requires $O(d \log^d m)$ query time. This algorithm is simple and easy to implement, and it does not rely on table compaction or automaton construction. Based on this evidence, the general multi-method problem does not appear to be an algorithmic bottleneck for supporting the new generation of OO languages.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A computer implemented process for determining which method of a plurality of methods is invoked in a first method invocation in an object-oriented computer program, wherein the methods each have a given name, the given names being identical, and wherein the methods use a number d of dispatchable arguments each representing an instance of a class containing a method having the given name, the process comprising:

for each possible invocation of the plurality of methods, mapping the method invocation into a d-dimensional rectangle, thereby creating a set of d-dimensional rectangles;

mapping the first method invocation to a d-dimensional point contained in one or more of the d-dimensional rectangles; and identifying a d-dimensional rectangle in the set containing the d-dimensional point in the set of d-dimensional rectangles which is smaller than any other d-dimensional rectangle containing the d-dimensional point, if any, thereby determining the method invoked by the first method invocation.

2. The process of claim 1, wherein the step of mapping comprises:

generating a class hierarchy tree comprising a plurality of nodes, each node representing a class containing a method having the given name;

associating a pair of numbers [f, l] with each node in the class hierarchy tree; and for each possible invocation of the plurality of methods, mapping the method invocation into a d-dimensional rectangle using the pair of numbers [f, l] associated with each node representing a class having an instance as one of the dispatchable arguments in the method invocation.

3. The process of claim 2, wherein the step of associating the pair of numbers with each node in the class hierarchy tree comprises computing an Euler Tour of the class hierarchy tree to thereby associate two or more position numbers with each node.

4. The process of claim 3, wherein the step of associating the pair of numbers with each node in the class hierarchy tree comprises selecting a first position number f and a last position number l of the two or more position numbers associated with each node.

5. The process of claim 2, wherein the step of mapping each possible method invocation into a d-dimensional rectangle comprises mapping each possible method invocation into a d-dimensional rectangle defined as $r=[f_1, l_1] \times [f_2, l_2] \times \ldots \times [f_d, l_d]$, where $[f_i, l_i]$ is the pair of numbers associated with each node representing a class having an instance as one of the dispatchable arguments in the possible method invocation, for all $1 \leq i \leq d$.

6. The process of claim 2, wherein the step of mapping the first method invocation to a d-dimensional point comprises selecting one number of the pair of numbers associated with each node representing a class having an instance as one of the dispatchable arguments in the first method invocation.

7. The process of claim 2, wherein d=2, wherein the class hierarchy tree comprises an ordered path of classes, and wherein the step of determining whether any d-dimensional rectangle is smaller than any other d-dimensional rectangle containing the d-dimensional point comprises determining whether any set of numbers pairs [f, l] used to map the d-dimensional rectangles is uniquely rectangularly visible from the d-dimensional point.

8. The process of claim 1, comprising determining whether an ambiguity exists for the first method invocation.

9. The process of claim 8, wherein the step of determining whether an ambiguity exists comprises identifying at least two d-dimensional rectangles containing the d-dimensional point neither of which encloses the other.

10. The process of claim 9, wherein the step of determining whether an ambiguity exists further comprises determining that no additional d-dimensional rectangle exists containing the d-dimensional point and which is completely enclosed within the at least two d-dimensional rectangles.

11. The process of claim 1, wherein d=2.

12. The process of claim 11, wherein the step of determining whether a rectangle is smaller than any other rectangle containing the point comprises:

(a) for any given integers i,j, decomposing a dummy rectangle enclosing the point into a plurality of subdivisions $U_{ij}[u,v]$ defined by rectangular regions $[(u-1) L^{i-1}, u L^{i-1}] \times [(v-1) L^{j-1}, v L^{j-1}]$;

(b) determining which subdivision $U_{ij}$ of the plurality of subdivisions $U_{ij}[u,v]$ contains the point;

(c) given rectangles in a subset $R_{ij}$ of the set of rectangles, the subset $R_{ij}$ including rectangles having widths lying in a first range $[L^{i-1}, L^i]$ and having lengths lying in a second range $[L^{j-1}, L^j]$, classifying the rectangles in the subset $R_{ij}$ into a plurality of groups based on a manner in which the rectangles in the subset $R_{ij}$ overlap the subdivision $U_{ij}$; and (d) performing a query in each group to determine whether one or more rectangles classified in the group enclose the point.

13. The process of claim 12, wherein the groups include a first group in which the rectangles in the subset $R_{ij}$ overlap the subdivision $U_{ij}$ completely, a second group in which the rectangles in the subset $R_{ij}$ overlap the subdivision $U_{ij}$ along only one side of the subdivision $U_{ij}$, and a third group in which the rectangles in the subset $R_{ij}$ overlap only one corner of the subdivision $U_{ij}$.

14. The process of claim 12, comprising, if no rectangles in any of the groups enclose the point, increasing the value of given integers i and j and repeating steps (a)–(d).

15. The process of claim 12, comprising, if only one rectangle classified in a first group is determined to enclose the point, storing the rectangle as a smallest rectangle.

16. The process of claim 15, comprising, if a rectangle classified in a second group is determined to enclose the point, determining whether either of the rectangles enclosing the point is smaller than the other, and storing the smaller rectangle as the smallest rectangle.

17. The process of claim 15, comprising, if a plurality of rectangles classified in a second group are determined to enclose the point, determining whether the rectangles in the plurality of rectangles classified in the second group enclose the smallest rectangle, whereby if the rectangles in the plurality of rectangles classified in the second group enclose the smallest rectangle then the smallest rectangle remains stored as the smallest rectangle, and whereby if any one or more rectangles in the plurality of rectangles classified in the second group do not enclose the smallest rectangle then an ambiguity exists.

18. A computer implemented method for identifying a rectangle enclosing a point which is smaller than all other rectangles in a set of rectangles enclosing the point, the method comprising:

(a) for any given integers i,j, decomposing a dummy rectangle enclosing the point into a plurality of subdivisions $U_{ij}[u,v]$ defined by rectangular regions $[(u-1) L^{i-1}, u L^{i-1}] \times [(v-1) L^{j-1}, v L^{j-1}]$;

(b) determining which subdivision $U_{ij}$ of the plurality of subdivisions $U_{ij}[u,v]$ contains the point;

(c) given rectangles in a subset $R_{ij}$ of the set of rectangles, the subset $R_{ij}$ including rectangles having widths lying in a first range $[L^{i-1}, L^i]$ and having lengths lying in a second range $[L^{j-1}, L^j]$, classifying the rectangles in the subset $R_{ij}$ into a plurality of groups based on a manner in which the rectangles in the subset $R_{ij}$ overlap the subdivision $U_{ij}$; and (d) performing a query in each group to determine whether one or more rectangles classified in the group enclose the point.

19. A system for determining which method of a plurality of methods is invoked in a first method invocation in an object-oriented computer program, wherein the methods each have a given name, the given names being identical, and wherein the methods use a number d of dispatchable arguments each representing an instance of a class containing a method having the given name, the process comprising:

means for generating a class hierarchy tree comprising a plurality of nodes, each node representing a class containing a method having the given name;

means for associating a pair of numbers [f, l]; with each node in the class hierarchy tree;

means for mapping each possible invocation of the plurality of methods into a d-dimensional rectangle using the pair of numbers [f, l] associated with each node representing a class having an instance as one of the dispatchable arguments in the method invocation, thereby creating a set of d-dimensional rectangles;

means for mapping the first method invocation to a d-dimensional point contained in one or more of the d-dimensional rectangles; and means for determining whether any d-dimensional rectangle containing the d-dimensional point in the set of d-dimensional rectangles is smaller than any other d-dimensional rectangle containing the d-dimensional point, and for identifying the smallest d-dimensional rectangle if any as representing the method invoked by the first method invocation.

20. The process of claim 1, further comprising the step of:

invoking the method determined by the identified d-dimensional rectangle.

* * * * *